Aug. 4, 1953        S. G. TILDEN        2,647,592
NONSQUEALING BRAKE ASSEMBLY
Filed Dec. 17, 1948        2 Sheets-Sheet 1
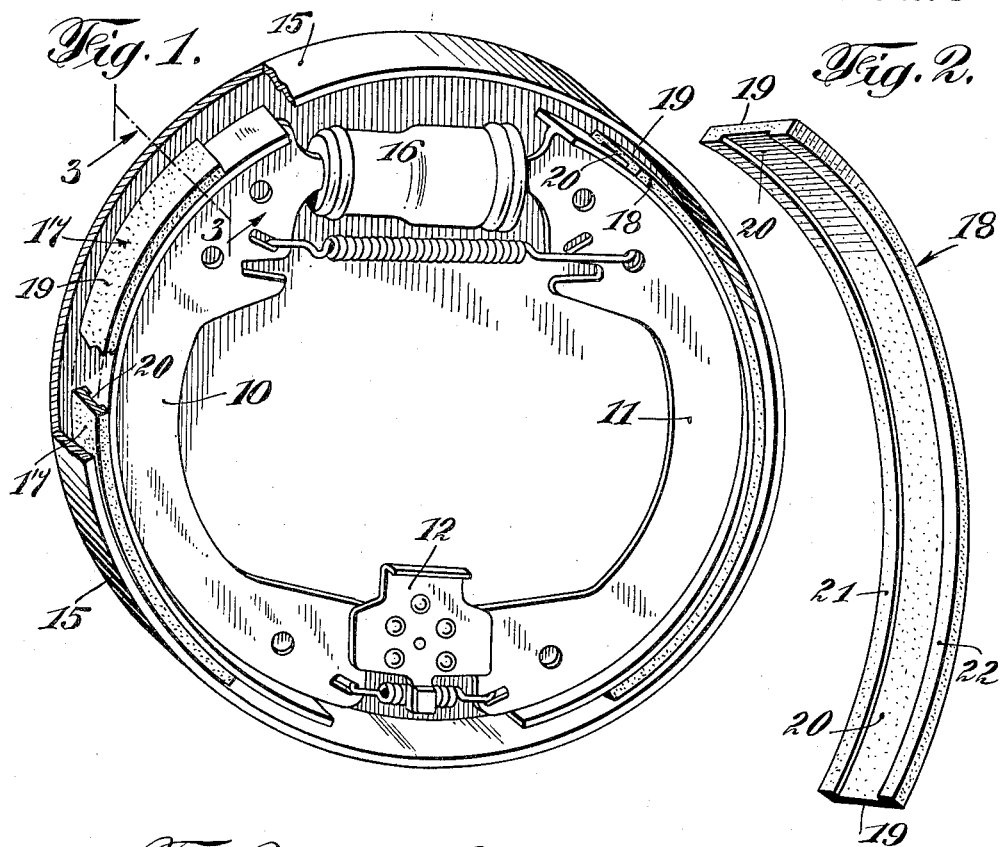
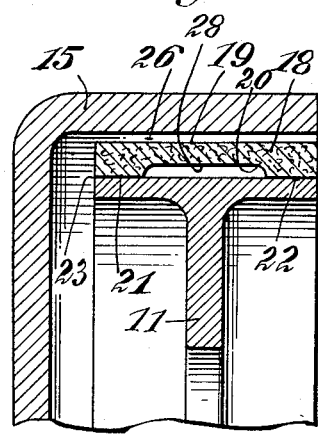
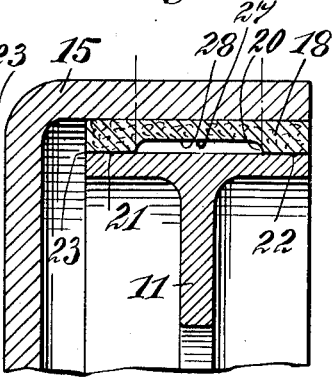
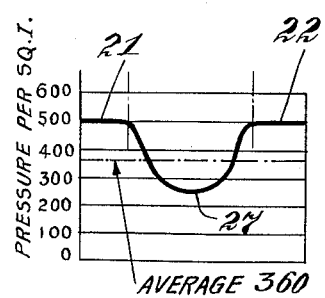
INVENTOR.
Sydney G. Tilden
BY
C. P. Goepel
his ATTORNEY Aug. 4, 1953     S. G. TILDEN     2,647,592
NONSQUEALING BRAKE ASSEMBLY
Filed Dec. 17, 1948     2 Sheets-Sheet 2
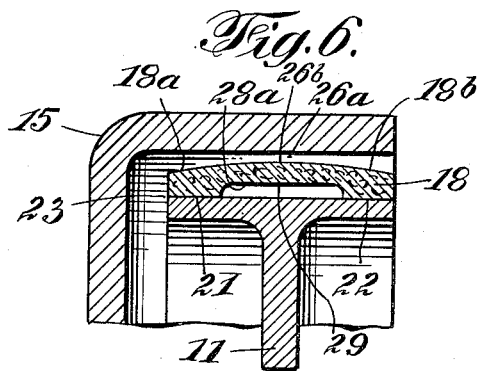
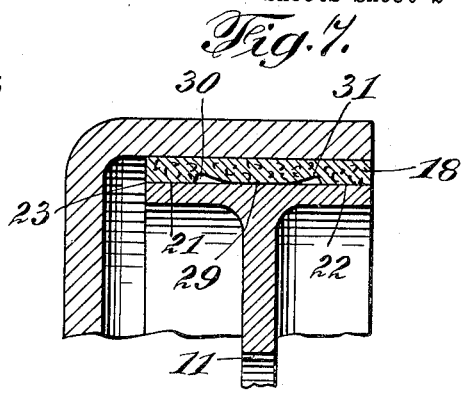
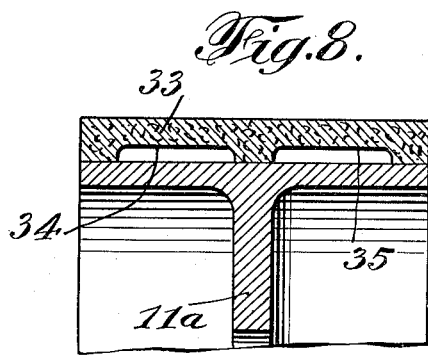
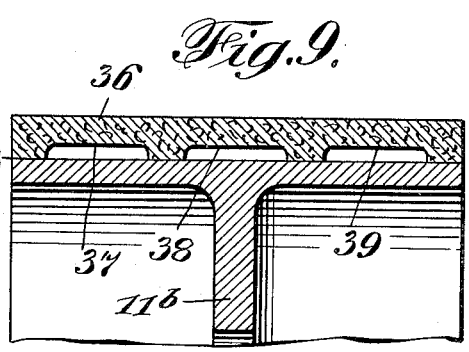
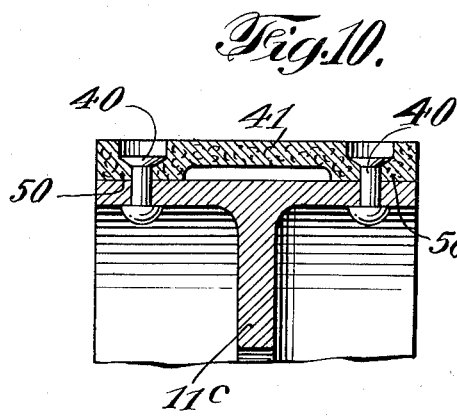
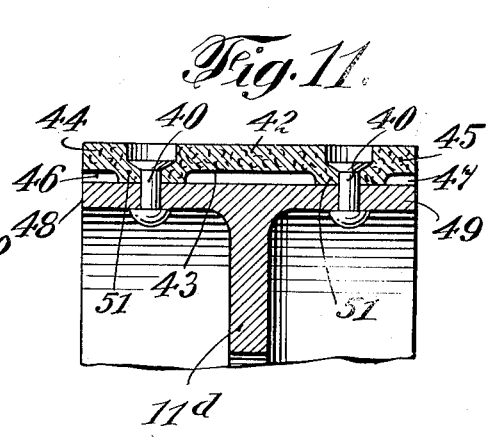
INVENTOR.
Sydney G. Tilden
BY
C. P. Goepel
his ATTORNEY Patented Aug. 4, 1953

2,647,592

UNITED STATES PATENT OFFICE 2,647,592

NONSQUEALING BRAKE ASSEMBLY

Sydney G. Tilden, Stewart Manor, N. Y., assignor to The Permafuse Corp., a corporation of New York Application December 17, 1948, Serial No. 65,796

1 Claim. (Cl. 188—261)

This invention relates to brake lining friction material segments, and has for its object to provide an improved segment which tends to considerably reduce the squeak during application of the brakes.

The tendency of all automotive type friction brakes to squeak during application of the brakes is an accepted fact within the industry. Apparently many factors are concerned which bear upon this tendency such as the coefficient of friction between the lining and the brake drum, the design and rigidity of the brake drum, the material of which the brake drum is made, the design and rigidity of the brake shoe, the design and rigidity of the brake backing plate and the means used to attach the friction material segments to the brake shoe.

In the service or replacement field particularly, but also in the field of original design and manufacture, it is not always possible, economical or feasible to alter certain of the above factors in order to reduce the squeak tendency.

For instance, to reduce the tendency to squeak, the coefficient of friction between brake lining and brake drum can be reduced by using certain "low friction" brake linings but this reduces the effectiveness of the brake and may well make an unsafe vehicle for a woman to drive. The brake drum may be redesigned to reduce brake squeak but so doing may add to the unsprung vehicle weight and materially reduce the riding quality of the vehicle and the tire life. As known, useful life of the brake lining can be greatly increased by bonding or fusing the lining segment directly to the brake shoe instead of employing brake lining rivets and a number of bonding agents and methods have been developed for this purpose. Such rigid attachment between the lining and the brake shoe however increases the tendency of the brake assembly to squeak and frequently induces a high pitched most annoying noise variously described within the trade as "pin-squeak," "pin-scratch," etc.

In my pending application Serial No. 750,398, filed May 26, 1947, I have described a method of reducing brake squeak by providing supported and unsupported areas or brake lining accomplished by means of introducing a third or intermediate member placed between the brake lining segment and brake shoe, and in the embodiment shown said intermediate member has a plurality of holes so that the lining is spatially separated from the brake shoe at these holes, and flexing of the lining results. I have also described in this pending application another embodiment consisting of an improved brake segment having supporting areas with a space between so that the lining at this space is spatially separated from the brake shoe to permit flexing of the segment without the use of an intermediate member.

The present improvement consists in providing one or more grooves running lengthwise of the segment in the inside of the lining segment of hard material of uniform density, so that the lining is supported and attached to the brake shoe by the flanges formed by the groove running lengthwise of the segment and the full length of the same, the lining being unsupported at the adjacent area, also running lengthwise of the segment and the full length of the same, the brake lining being free to flex at the unsupported areas longitudinally of the brake lining, thus achieving a flexibility and noise dampening ability to reduce annoying brake squeak, by the cushioning action when the brake is applied.

The special advantage attendant the same, is the ease of manufacture of the one piece segment.

The invention will be more fully described hereinafter, embodiments thereof shown in the drawings, and the invention will be finally pointed out in the claim.

In the accompanying drawings,

Fig. 1 is a perspective view of typical automobile brake assembly including brake lining segments embodying this improvement, attached to the brake shoes by cementitious means;

Fig. 2 is a perspective view of the improved brake lining segment showing a single groove running lengthwise of the segment on its inside or brake shoe adjacent surface;

Fig. 3 is a transverse section on line 3—3 of Fig. 1 showing the brake shoe in the released or "off" position and the brake lining segment attached thereto by cementitious means in the new or unworn condition.

Fig. 4 is the same as Fig. 3 except that the brake shoe is in the applied or "on" position;

Fig. 5 is a force diagram showing how the unit pressure between brake lining segment and brake drum varies across the width of the segment;

Fig. 6 is the same as Fig. 3, showing the brake shoe in the released or "off" position, but showing a worn segment;

Fig. 7 is the same as Fig. 6, but showing the brake shoe in the applied or "on" position;

Fig. 8 is a transverse section of a brake shoe with another form of new or unworn brake lining segment attached thereto by cementitious means, the segment having two longitudinal grooves on its inside or brake shoe adjacent surface;

Fig. 9 is a transverse section of a brake shoe with another form of a new or unworn brake lining segment attached thereto by cementitious means, the segment having three longitudinal grooves on its inside or brake shoe adjacent surface.

Fig. 10 is a transverse section of a brake shoe with a new or unworn friction material segment attached thereto by means of countersunk brake lining rivets, the friction material segment having one groove on its inside or brake shoe adjacent surface, and Fig. 11 is a transverse section of brake shoe with a new or unworn brake lining segment attached thereto by means of countersunk brake lining rivets, the friction material segment having a central groove and two edge grooves on its inside or brake shoe adjacent surface.

Similar characters of reference indicate corresponding parts throughout the various views.

Referring to Fig. 1, the brake shoes 10 and 11 hinged on the anchor 12, are moved outwardly against the brake drum 15 by means of an hydraulic actuating cylinder 16. The brake shoes 10 and 11 are lined with brake lining segments 17 and 18 which are attached to the brake shoes 10 and 11 by cementitious means. The parts shown, excepting the improved lining, are of standard make and are not claimed herein, and being known are not further described.

In Fig. 2, the brake lining segment 18 (which is a substantial duplicate of segment 17) has a single groove 20 running lengthwise of the segment on its inside or brake shoe adjacent surface, for the length of the lining, formed by two marginal ribs or flanges extending from end to end of the segment. The outer or brake drum adjacent surface 19 is longitudinally cylindrical.

In Fig. 3, the brake lining segment 18 is shown attached to the brake shoe 11 at the areas of the flanges 21 and 22 by the cement line 23. Being in a new or unworn condition, the outer or brake drum adjacent surface 19 of the brake lining segment 18 is straight in the section shown. The segment 18 is separated from the brake drum 15 by a clearance space 26, and the segment 18 has an unsupported area 28.

In Fig. 4, the brake shoe 11 is shown in the applied position with no clearance existent between the brake lining segment 18 and the drum 15 and with pressure being exerted between the brake shoe 11 and the drum 15 corresponding to that set up in an emergency application of the brakes. The unit pressure across the face of the brake lining segment 18 under this brake application pressure is shown in the pressure diagram (Fig. 5). It will be noted that the unit pressure is maximum over the supported areas of the flanges 21 and 22 of the brake lining segment 18 and drops to a minimum in the center 27 of the unsupported area 28.

In Fig. 6, is shown the brake shoe 11 in the "off" or released position and the brake lining segment 18 with clearance space 26a between the brake lining segment 18 and the drum 15. The brake lining segment 18 is shown as it would be after considerable use showing more wear at the outside edges 18a and 18b than in the center 26b and in Fig. 7, the same brake shoe 11 and lining segment 18 is shown in the "applied" position with the lining segment 18 deformed under the pressure of braking so that its central part 29 is now actually in contact with the brake shoe 11, leaving, however, spaces 30 and 31.

The characteristic deformation of the brake lining segment 18 under the pressure exerted between the brake shoe 11 and the drum 15 is the essence of this invention and may be explained further as follows:

As the brake shoe 11 is forced against the brake drum 15 with the improved brake lining segment 18 between, the segment 18 in cross section can be considered as a beam uniformly loaded and supported at the ends. This load will cause deflection in the beam and the amount of deflection will follow definite laws of mechanics and need not be gone into in detail in this application other than to point out that the deflection is directly proportional to the load imposed and to the cube of the length of the span and is inversely proportional to the modulus of elasticity of the material and the moment of inertia of the cross section.

In the case of a typical passenger car brake, the load is the pressure exerted between the brake lining 18 and the brake drum 15 and the maximum pressure can be readily computed after making several assumptions. If we assume that the gross vehicle weight is 4000 lbs. and that a maximum retarding force equal to the weight of the car is desired, it will be necessary to do approximately 60% of the braking with the front wheel brakes and 40% of the braking with the rear wheel brakes due to the shift in the center of gravity of the vehicle forward under such high deceleration rates. The front wheel brakes must then be able to exert a total retarding force of 2400 lbs. or 1200 lbs. each. If we assume a tire size of 15 x 6.00 and a brake drum diameter of 11", the retarding force at the brake drum must be 2950 lbs. in order to exert a 1200 lb. force at the road, $$1200 \times \left[ \frac{15 + (2 \times 6.00)}{11} \right]$$

If we assume that the forward acting brake shoe will do ⅔ of the work and the reverse brake shoe ⅓ of the work, the forward brake shoe must then exert 1970 lbs. retarding force. If we assume a coefficient of friction between brake lining and brake drum of 0.3, the total pressure which must be exerted by this brake shoe on the brake drum will be 6550 lbs. If we assume a brake segment width of 1¾" and a length of 10⅜", the total area of brake lining which will exert the total pressure of 6550 lbs. is 18.2 in.² Thus the average unit pressure of the highest stressed brake shoe in this particular case will be 360 p. s. i. The groove 20 in the brake lining segment 18, Fig. 2, must be designed so that a desired amount of deflection will be secured under this unit pressure.

With the improved design of brake lining segment, the pressure between the segment 18 and drum 15 will vary across its width being a maximum at the flanges 21 and 22 (Fig. 4), where the segment 18 is directly supported by the brake shoe 11 and a minimum at the center 17 of the unsupported area 28, where maximum deflection takes place. It is believed that the brake lining segment 18 will wear in direct proportion to the work which it does in setting up a retarding force to stop the car and that this retarding force will be in direct proportion to the pressure exerted between the segment 18 and the brake drum 15. Therefore, after use, the segment 18 (Fig. 4), will have worn as shown in Fig. 6, and with the brake applied and pressure being exerted between the lining and drum, the lining over the unsupported area 28a will flex inwardly, toward the brake shoe 11 under the pressure exerted between the brake shoe 11 and the brake drum 15 until, in the eventual case shown in Fig. 7, actual contact has been made between the brake lining 18 and the brake shoe 11 at the central part of the unsupported area 29 leaving spaces 30 and 31.

With brake linings of varying widths in common use ranging from 1¾" to 3" and of varying thickness ranging from 3/16" to ⅜", the width, depth and number of grooves may be varied to control the flexibility of the unsupported areas. For instance, for brake linings 1¾" wide and 3/16" thick, I have found that a single groove ⅞" wide and 0.025" to 0.035" deep gives satisfactory results. In the wider sizes, the groove width may be increased up to 1½" particularly for brake lining ¼" thick. In segments 3" wide and ⅜" thick I have found that two grooves 1" wide and 0.035" to 0.050" deep, give satisfactory results.

Fig. 8 shows a friction material segment 33, having two longitudinal grooves 34 and 35, applied to the brake shoe 11a. Fig. 9 shows a friction material segment 36, having three longitudinal grooves 37, 38 and 39, applied to the brake shoe 11b.

In Figs. 6 to 9, the brake lining friction material segment is presumed to be attached to the brake shoe by cementitious means, as described in connection with Fig. 3.

I have found that a ratio of unsupported area to supported area in the range of 2:3 to 3:3 provides sufficient area for bonding the brake lining segment to the brake shoe by cementitious means and still provides sufficient unsupported area to permit proper flexing of the brake lining under braking action providing the proper width and depth of groove is selected. The width and depth of the groove must necessarily vary with the thickness of the brake lining segment and, to some extent, the modulus of elasticity of brake lining material.

Instead of or in addition to the cementitious applying means described, the improved brake lining segment may be attached to the brake shoe by means of brake lining rivets 40 (Fig. 10), as well known to the trade providing only that the rivets are located in the supported areas 50 of the segment 41 in Fig. 10 and 51 of the segment 42 in Fig. 11.

In Fig. 11, the segment 42 is provided with a central groove 43 and two edge grooves 46 and 47 leaving extended portions 44 and 45 at the lateral margins 48 and 49 of the brake shoe 11d.

The structure embodying this invention has generally the same contour and configuration of the known segment having concentric outer and inner cylindrical faces, excepting that the inner face does not have its entire surface in contact with the brake shoe surface, but has a substantial part removed by the formation of the groove. For example, in order to obtain continuous narrow flanges, continuing with the body portion to take up the pressure action, the body portion has considerably less pressures at the groove. The continuous track line action in coincidence with the rotary movement of the brake drum provides for a sliding action, until the final pressure is applied which may be characterized as a relative nonresisting action compared to that which results from the old segment, which takes up the pressure throughout the width and length of the segment. The improved segment has its two (or more) pressure lines or zones concentric with the drum and brake shoe pressure action separated by a web, which is under reduced pressure, probably enabling the vibrations of the pressure lines or zones to distribute the vibrations to the web, and the vibrations act on a reduced pressure portion, reducing their frequencies, and thus the resultant frequencies are less than when the entire width of the segment is set in vibration. The improved segment is made of hard rigid material which is uniformly dense.

I wish it to be understood that I do not desire to be limited to the exact details of construction shown and described, for obvious modifications will occur to a person skilled in the art.

I claim:

In a brake assembly having a brake shoe and a drum, the combination of an arcuate friction material segment of a hard rigid material of uniform density having an outer smooth unbroken convex surface adapted for faying relationship with the inner concave surface of said brake drum, said segment having a grooved portion at its inner concave surface with the balance of said concave surface adapted for faying relationship with the outer convex surface of said brake shoe, said grooved portion extending uninterruptedly longitudinally the length of the segment and being symmetrically disposed about the longitudinal centerline of the segment, the depth of the said groove being uniform longitudinally the length and transversely across the width of said segment and being between .025" and .050", and the width of the said groove being between 40% and 50% of the width of the segment, the said segment being adapted to be supported by said brake shoe at the ungrooved portions and the surface of the grooved portion being spatially separated from and entirely unsupported by the brake shoe, the said surface of said grooved portion forming a space between the said brake shoe and the said friction material segment, of substantially rectangular shape adapted to permit that surface of the said grooved portion to flex towards the said brake shoe when said segment is forced against the said brake drum by the brake shoe, and means for attaching the said segment to the said brake shoe.

SYDNEY G. TILDEN.

References Cited in the file of this patent

UNITED STATES PATENTS

| Number | Name | Date |
|---|---|---|
| 1,286,171 | Cory | Nov. 26, 1918 |
| 1,395,841 | Lavoie | Nov. 1, 1921 |
| 1,498,983 | Schmidt | June 24, 1924 |
| 1,716,090 | Schmidt | June 4, 1929 |
| 1,833,414 | Cram | Nov. 24, 1931 |
| 2,116,130 | Van Meter | May 3, 1938 |
| 2,239,574 | Schell | Apr. 22, 1941 |
| 2,330,368 | Judson | Sept. 28, 1943 |
| 2,438,483 | Tack | Mar. 23, 1948 |